June 11, 1968
H. H. WALKER
3,387,580
SUBMERSIBLE WATER CRAFT
Filed Oct. 22, 1965
3 Sheets-Sheet 1
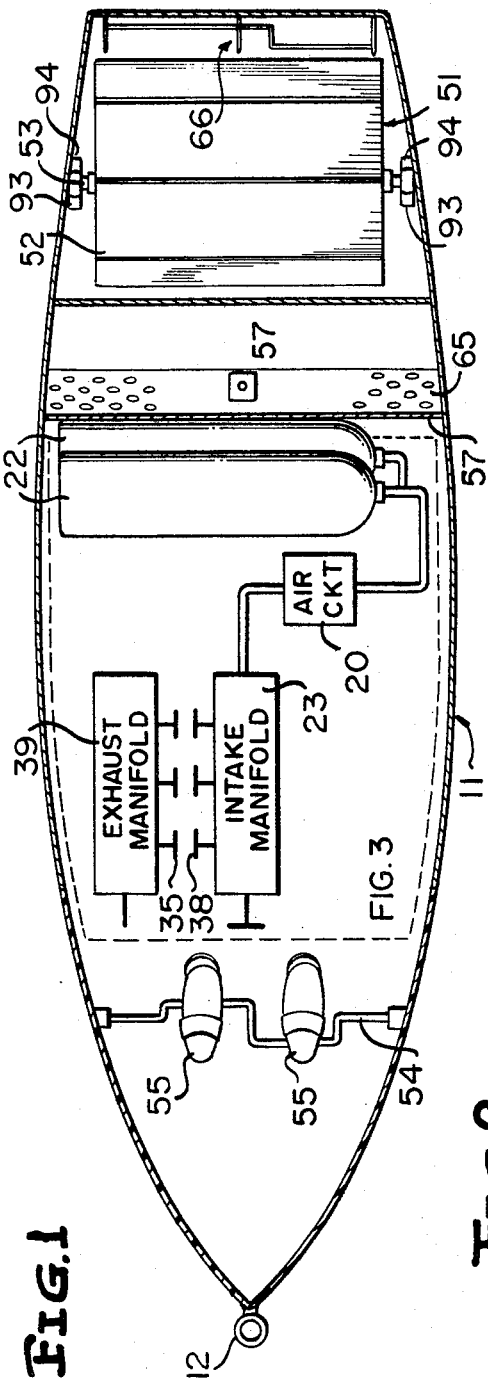
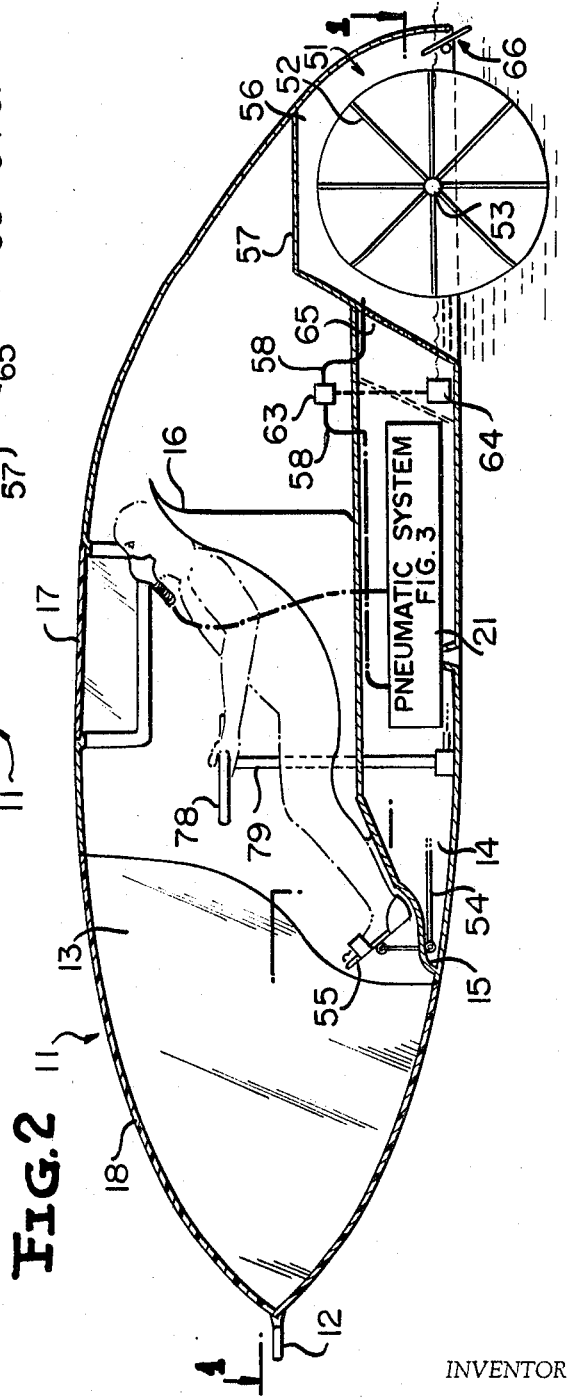
INVENTOR
HAROLD H. WALKER
BY *Hurvitz & Rose*
ATTORNEYS

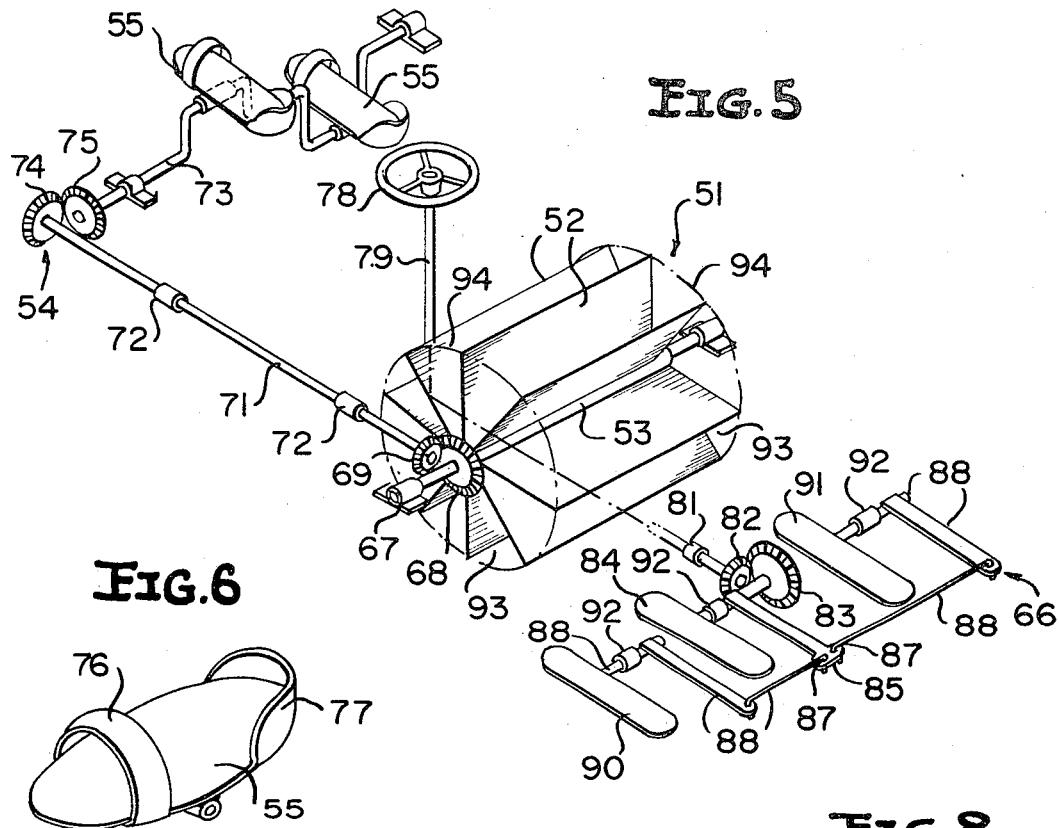
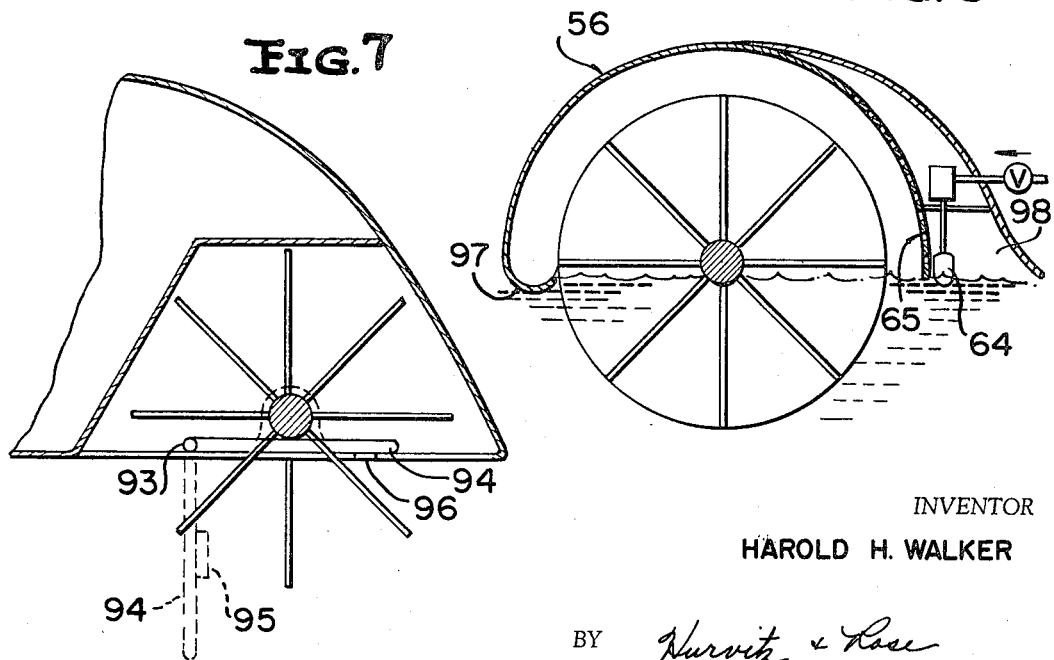

United States Patent Office 3,387,580
Patented June 11, 1968

3,387,580
SUBMERSIBLE WATER CRAFT
Harold H. Walker, 4801 Topping Road,
Rockville, Md. 20853
Filed Oct. 22, 1965, Ser. No. 501,059
16 Claims. (Cl. 114—16)

ABSTRACT OF THE DISCLOSURE

A submersible vehicle having a hull with walls subject to rupture at relatively low pressure differentials existing thereacross, said hull being maintained intact at various depths of submergence by providing pressurized gas internally of the vehicle so as to maintain the pressure differential appearing across the hull waves somewhat less than that pressure required to cause rupture. Additionally provided is a paddle wheel locomotive device for submersible vehicles wherein the lower portion of the wheel is maintained submerged and the axial and upper portions of the wheel are maintained in a gaseous environment, the volume of said gaseous environment being maintained substantially constant independent of the depth of submergence of said vehicle.

---

The present invention relates generally to submersible vehicles and, more particularly, to a submersible vehicle having a thin hull which is supported by high pressure gases from within the vehicle against the substantial hydraulic pressures developed by sea water on the hull exterior.

Two techniques are generally employed in the prior art to enable the hull of a submersible vehicle to withstand the large pressures exerted on it. According to the first approach, the submersible interior is maintained substantially at atmospheric pressure whereby a very large pressure differential exists across the hull thickness. The hull is able to withstand the pressure differential without collapsing by being fabricated from a thick, heavy and expensive material having the required strength. Of course, the resulting massive vehicle cannot be readily maneuvered nor can it operate at high speeds except with great amounts of power being expended. Also, it is cumbersome and not easily made portable for shipping from one place to another by trailer, for instance.

The second approach is to fabricate the hull from weak materials such as plastic, wood, or aluminum and provide the hull with openings so that the vessel's interior is flooded with water. Thereby, the pressure differential across the hull is reduced virtually to zero and the requirements for a strong material are obviated.

Flooding the submersible interior is not completely satisfactory, however, because it requires the vehicle occupants to be subjected to a water environment that may be cold, polluted or habitated by dangerous animal and vegetable life. Also, water appreciably limits movement of the vehicle occupants and prevents them from operating instruments, eating and drinking.

A further adverse effect with flooding the submersible interior arises from the mass added by the water contained within the vehicle. The water mass is sufficiently great to limit the craft's maneuverability.

According to the present invention, the enumerated difficulties of the prior art are overcome by supporting the submersible hull with high pressure from a gas that can be inhaled by the vehicle occupants. The gas pressure on the vessel interior is automatically maintained approximately equal to the water pressure on its exterior, thereby enabling relatively thin, weak and inexpensive materials to be utilized for the hull. Materials such as plastic, wood, aluminum, rubber, canvas, or any of the common boat building materials can be utilized for the hull. The frame can be constructed similar to boat frames. The frame and hull can also be constructed such that it can be folded up. The hull can be of either rigid or flexible material.

I have found that the typical small submersible, adapted to carry one or two passengers and having an interior volume of approximately 10 cubic feet of air space after the passenger and equipment are inside, requires about 0.58 cubic feet of air maintained at a static pressure of 2300 p.s.i. to support a collapsible wall, having no strength, at a depth of 300 feet. These pneumatic requirements can easily be satisfied by carrying less than two standard size scuba tanks, having internal volumes of 0.46 cubic feet, on board the submersible or by coupling the submersible with a mother ship via an air conducting line as described in my U.S. Patent No. 3,160,133. This pneumatic hull support system applies to both passenger carrying and non-passenger carrying submersible vehicles. Any of the conventional means of providing high pressure breathable gas to this system are applicable here.

Another feature of the present invention that can be utilized on vessels having the pneumatic hull support structure or with other submersibles, resides in providing a paddle wheel to assist in vehicle locomotion. The paddle wheel lower portion is immersed in sea water while its axial and upper segments are free to rotate easily by being in a pneumatic environment. The pneumatic environment is established by coupling gas from a high pressure source, such as employed in the pneumatically supported hull, into a compartment where the paddle wheel is situated. The gas is of sufficient pressure to force sea water out of the compartment to achieve the desired freedom of wheel rotation. The water level is automatically maintained substantially constant by controlling gas flow into the chamber in response to activation of a float valve.

The paddle wheel arrangement does not have the many disadvantages associated with screw propellers of the type normally employed in submersibles. In particular, a slowly rotating paddle wheel delivers considerably more power than a slowly rotating screw propeller. In submersibles of the type being considered slow rotation of the propelling medium is usualy mandatory because of the minimum power available, from a small motor or via manual means. The small available driving power necessitates a system of minimum power loss, i.e. a system having as few gears as possible, to maximum efficiency and prevent slippage. In addition, paddle wheels do not have as great a tendency to become tangled in seaweed and other underwater growth as screw propellers.

It is an object of the present invention to provide a new and improved submersible vessel.

Another object of the present invention is to provide a new and improved submersible vessel having a hull fabricated from lightweight, inexpensive and weak materials in which the interior is maintained dry; whereby high speeds and relatively great maneuverability are attained and the vehicle occupants are located in a relatively warm environment free from possible pollution and dangerous living matter.

An additional object of the invention is to provide a new and improved system for pneumatically supporting the hull of a submersible while supplying a gas suitable for breathing by the vehicle occupants.

A further object of the invention is to provide a new and improved locomotion system for a submersible; which locomotion system includes a paddle wheel having only a small segment thereof immersed in sea water and the remainder in a pneumatic atmosphere.

Still another object of the invention is to provide a submersible vehicle having a thin hull and a paddle wheel and means for supplying gas to support the vehicle hull against underwater pressure and for maintaining a large segment of the paddle wheel in a gaseous environment by forcing water out of a compartment in which the paddle wheel is located.

The above and still further objects, features and advantages of the present invention will become apparent upon consideration of the following detailed description of one specific embodiment thereof, especially when taken in conjunction with the accompanying drawings, wherein:

FIGURE 1 is a top sectional view of a preferred embodiment of the submersible vehicle of the present invention taken along lines 1—1 of FIGURE 2;

FIGURE 2 is a side sectional view of the vehicle illustrated in FIGURE 1;

FIGURE 5 is an illustration of the linkages for rotating the paddle wheel and the rudder of the vehicle illustrated in FIGURES 1 and 2;

FIGURE 6 is a detailed view of a stirrup illustrated in FIGURE 4;

FIGURE 7 is an illustration of the apparatus for enabling the paddle wheel to be removed; and FIGURE 8 is an illustration of another embodiment of the paddle wheel assembly and compartment.

Figure 4:
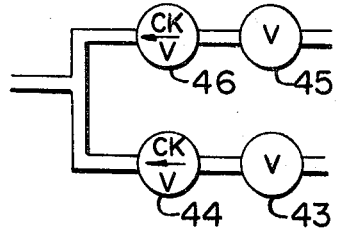
FIGURES 3 and 4 are pneumatic circuit diagrams of apparatus employed in the vehicles of FIGURES 1 and 2.

Reference is now made to FIGURES 1 and 2 of the drawings wherein there is illustrated submersible vehicle 11 having a water-tight streamlined hull or body, fabricated from a thin, lightweight, weak material, having a relatively poor ability to withstand, without rupture, pressure differences across its thickness. I have found that molded plastic is a particularly advantageous material because of its lightweight and water sealing characteristics although any thin, rigid or flexible material of suitable strength may be employed. Vehicle 11 is generally of the type adapted to be towed from a mother ship at high speeds under, on or above the water surface and is accordingly provided with towing eye 12 at its center of drag. The vehicle has an interior volume sufficient to allow one or more occupants and the necessary equipment to be carried thereon. Submersible 11 is preferably provided with diving planes powered or manually operated with airplane-type controls (not shown) so that it can dive and ascend rapidly, such as disclosed by my aforementioned patent, and is streamlined for high speed operation as well as ease of maneuverability. Conventional ballasting will be used.

Vehicle 11 is divided into passenger and equipment compartments 13 and 14, respectively. The compartments are separated by false bottom air pervious floor 15 so that the heavy equipment is at the bottom of the vehicle, below its center of gravity. In the mid-section of passenger compartment 13 is located contour couch 16 on which the vehicle operator reclines. Hinged hatch 17 is positioned immediately above couch 16 to enable ingress and egress of the operator to vehicle 11. The forward and aft sections 18 and 19, respectively, of submersible 11 are made of a transparent plastic material that seals the vessel interior from the surrounding sea water while enabling the operator to see the area being traversed.

Figure 3:
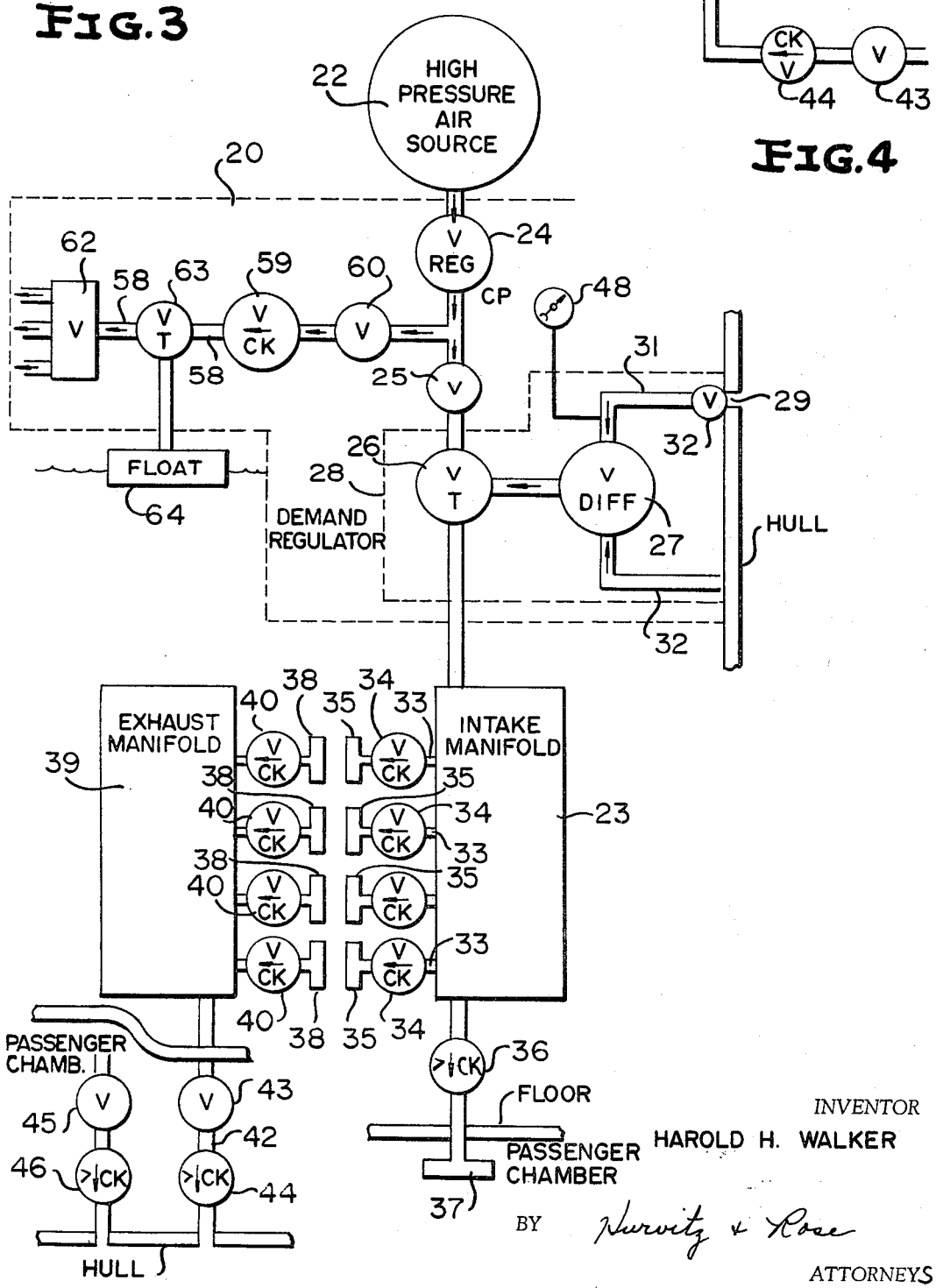

Within equipment compartment 14, on the bottom of the vehicle hull, is pneumatic system 21. Pneumatic system 21 includes a plurality of high pressure air tanks 22 (FIGURES 1 and 3), which may be of the type frequently employed in scuba diving as air sources. Each of tanks 22 is of the relatively small type that has an interior volume of 0.46 cubic feet and wherein pressure is maintained at approximately 2300 p.s.i. While the high pressure air source is illustrated as comprising a plurality of tanks, it is to be understood that it may be on board the mother, towing ship and coupled via an air line to vehicle 11.

Air from source 22 is fed to intake manifold 23 via part of air control circuit 20 that includes regulator valve 24, manually operated valve 25 and throttle valve 26 that is responsive to pressure differential transducer 27. Regulator valve 24 is adjusted to reduce the high pressure output gas emanating from source 22 to a pressure slightly above the maximum underwater pressure to be encountered by vessel 11. From reducing or regulator valve 24, the circuit proceeds to manually controlled valve 25, the activator of which is positioned in passenger compartment 13 at a location convenient to the vehicle pilot so he can cut off the system in the event of a malfunction.

From valve 25, the circuit proceeds to throttle valve 26, that is preferably part of demand regulator 28 of the type employed in scuba equipment. The demand regulator and the rest of the scuba system is mounted in quick release clip assemblies (not shown) on the floor of the hull. This provides a portable air supply for safety purposes in case of an accident where the vehicle has to be abandoned. The demand regulator connects to aperture 29 through the hull via manual valve 32. Quick disconnect couplings are provided in the system as needed to make the scuba assembly easily removable. Aperture 29 communicates directly with manually activated valve 32, that is not a part of demand regulator 28. Valve 32 is closed when regulator 28, which has a water-tight, quick disconnect coupling with the hull, is removed. From valve 32, water line 31 couples the water pressure on the hull exterior to differential transducer 27. The other input to transducer 27 is from air line 32, that has its end open to the hull interior. Transducer 27 converts its water pressure input to a signal that is subtracted from the pneumatic signal picked up by line 32. The difference signal is coupled to throttle valve 26 to control the flow of air into intake manifold 23. Valve 26 responds to the output of differential transducer 27 so as to increase the flow of air to manifold 23 when the sensed hydraulic pressure on the hull exterior exceeds the pneumatic pressure on the hull interior by a slight predetermined value that the vehicle hull is capable of withstanding, on the order of 3 p.s.i. In response to the two sensed pressures being different by said amount, throttle valve 26 maintains constant flow to intake manifold 23 and for smaller differences decreases the flow rate to the manifold.

Intake manifold 23 includes a plurality of output ports 33, to which are connected check valves 34 and quick disconnect air line couplers 35. Check valves 34 prevent stale air that may be within vehicle 11 from being recirculated while couplers 35 enable air hoses from scuba face masks that the vehicle occupants are wearing to be easily connected to the breatheable air supply. In general, only one or two of couplers 35 are at any time employed for scuba purposes and the remaining couplers supply high pressure air to the vessel interior. Air is also supplied from manifold 23 to passenger chamber 13 via check valve 36 and coupling 37 to pressurize the hull. It is realized that the gas supply system and related art that scuba drivers use are directly applicable here. The scuba system shown is an open loop system. A closed loop system can also be similarly used here.

Return air lines from the scuba face masks are fed to some of the quick disconnect couplings 38 that feed exhaust manifold 39 via check valves 40.

The pneumatic circuit for providing sufficient pneumatic pressure to support the relatively weak walls of submersible 11 includes a safety provision for venting excess air pressure from passenger chamber 13. It comprises manually activated valve 45, having its inlet in passenger chamber 13 and its outlet connected to check valve 46. The outlet of check valve 46 is at the top of the submersible, a few inches removed from the outlet of exhaust manifold 39, as coupled through check valve 44. By utilizing a pair of exhaust lines, the possibility of excess pressure build-up within the submersible is precluded in the event of malfunction to one system. These exhaust outlets are situated such that they can be watched by the pilot. Bubbles coming from these ducts give the pilot another type of indication as to how the pressure regulating system is functioning.

The described arrangement, in addition to minimizing the pressure differential across the vehicle hull, is also advantageous because it enables passenger compartment 13 to always remain in a fresh air environment. Fresh air exists in the passenger compartment because all exhaled air from the occupants goes through the exhaust manifold. There is virtually no possibility of exhaled air being fed from a scuba mask to the vessel interior because two check valves are provided on each of the inlet and exhaust lines to the mask. The term mask here refers to the mouthpiece and face mask together. One valve in each line is located at one or the other of manifolds 23 and 39 while a second valve is included in the scuba equipment per se. Hence, the fresh air in the vessel serves as a reservoir for the occupants in the event of an emergency.

Another safety feature of the present invention is that the pressure difference between the hull interior and exterior is monitored by coupling the line 31 to pressure gage 48. Gage 48 is positioned in the passenger cabin before the vehicle pilot. In the event the exterior pressure reaches a predetermined level above the interior pressure, as indicated by gage 48, the pilot is apprised of the fact that he must raise the vehicle to shallower waters.

Returning now specifically to FIGURES 1 and 2 of the drawings, there is illustrated a system for enabling self-locomotion of the submersible underwater by means of paddle wheel 51. Paddle wheel 51 comprises a plurality of paddles 52 fixedly mounted on axle 53, that is journaled to bearings (not shown) towards the aft end of the vehicle. Paddle wheel 51 is driven via mechanical linkage 54, driven by pedals 55 from the feet of the pilot, and coupled through the vehicle by a sealing gasket.

Paddle wheel 51 is contained in canopy 56, that is hydraulically and pneumatically sealed from the vehicle interior by transparent, water-tight partitions 57. Canopy 56 is maintained in a high pressure gaseous atmosphere by being supplied with air from pneumatic system 21 via air lines 58. As seen from FIGURE 3, lines 58 are connected via check valve 59 and manually operated valve 60 to the outlet side of regulator valve 24. The flow of air from check valve 59 to distributor valve 62, that feeds air via connecting hoses to each portion of canopy 56 is controlled in response to throttle valve 63 that is activated by float 64. Float 64 senses the water height within canopy 56 relative to axle 53 of wheel 51 and energizes valve 63 so that the water level regulates to a predetermined distance below the axle and above the canopy bottom.

To minimize the transient effects of water level changes from turbulence resulting from rotation of paddle wheel 51, on float 64, baffle 65 separates canopy 56 into two sections. Float 64 is located in the smaller, forward section while paddle wheel 51 and rudder assembly 66 are positioned in the larger aft section. To maintain the average water depth in the two sections substantially the same, without transmitting transient variations to float 64, baffle 65 is provided with a multiplicity of small holes through its entire area.

In operation, air is supplied to canopy 56 to form a bubble therein. The bubble extends below the axle 53 of paddle wheel 51 so the wheel operates the most efficiently and is easily rotated by the pilot and self-locomotion can be effected in either the forward or the aft directions. When the craft remains at constant depth under the water surface, the bubble exerts constant force on the water and there is no need for additional air to be supplied to canopy 56. In consequence, valve 63 is adjusted to be closed when the level of float 64 indicates that a predetermined static condition between the canopy water level and axle 53 has been attained. As the vehicle descends, the level of float 64 ascends causing valve 63 to be opened and additional air to be fed to canopy 56 from system 21. In response to the vehicle ascending, the water level within canopy 56 decreases and float 64 is positioned to maintain valve 63 closed. The canopy water level decreases until the bubble becomes so large that it tends to push air below the bottom of the vehicle. If the water level exceeds the predetermined level, float 64 causes valve 63 to open and the air bubble lower level again stabilizes. Because the bubble is contained in canopy 56, very little air is needed to maintain it once formed.

In the event of vehicle 11 becoming unstable whereby it tilts excessively to one side or turns upside down, the position of float 64 becomes meaningless, air is no longer supplied to canopy 56 and it is filled with water. The water in canopy 56 cannot be fed back into pneumatic system 21 because of check valve 59. With canopy 56 filled with water, paddle wheel 51 becomes virtually useless and the craft must be righted, by shifting weight therein or by ballasting, before the wheel can be utilized effectively. With the vehicle returned to its stable, upright position float 64 activates valve 63 so air is supplied to canopy 56 and the bubble is reformed.

An alternative arrangement for supplying air to canopy 56 is illustrated in the partial pneumatic circuit diagram of FIGURE 4. According to this embodiment, the passenger chamber and exhaust manifold outlets are combined, after passing through valves 45, 46 and 43, 44, respectively, and are fed to canopy 56 shunting the gas supply to the canopy through line 58. The system of FIGURE 4 is more efficient in the use of air than the system of FIGURE 3 since the exhaust air is not merely outgassed. The bubble level in canopy 56 is controlled in exactly the same manner as discussed previously.

Reference is now made to FIGURE 5 of the drawings wherein there are illustrated, in detail, paddle wheel 51, rudder assembly 66 and the drive systems thereof.

Axle 53 of paddle wheel 51 is mounted for rotation by being connected, at each of its ends, to the vehicle walls by bearings 67. Fixedly mounted on shaft 53, between one end of paddle wheel 51 and one of bearings 67, is bevel gear 68. Gear 68 meshes with bevel gear 69, located on the end of drive shaft 71. Drive shaft 71 is journaled to bearing 72, that is fixedly mounted on the bottom of the vehicle hull. The other end of drive shaft 69 is driven by shaft 73 via bevel gears 74 and 75. Shaft 73 is journaled to bearings 76 and is driven by the feet of the vehicle operator via pedals or stirrups 55 that are pivotably mounted thereon.

As illustrated in FIGURE 6, each of pedals 55 includes toe strap 76 and heel retainer 77 and is pivoted to shaft 73 at a central point. Thereby, shaft 73 and paddle wheel 51 can be driven clockwise or counterclockwise by rotating the pedals in either direction.

Another feature of the paddle wheel of the present invention is that end discs 93 thereof each has a rubber tire 94 mounted thereon. Tires 94 aid in enabling facile movement of the vehicle into and out of the water and protect the wheel while the vehicle is in the water and on land.

To reduce the load on bearings 67 and on the vehicle hull, and to enable paddle wheel 51 to be more readily removed while the vehicle is floating on the water surface, paddle wheel 51 is made as buoyant as possible. Buoyancy is attained by making axle 53 hollow, and by fabricating end discs 93 and paddles 52 from expandable polystyrene pellets that form a multiplicity of separate water impervious pockets filled with air.

The vehicle steering mechanism includes rudder steering wheel 78, positioned so that the hands of the operator can easily grasp and rotate it. Wheel 78 is fixedly mounted to rotating control shaft 79. The end of shaft 79 remote from steering wheel 78 is journaled to bearing 81 and has pinion 82 attached thereto. Pinion 82 meshes with toothed wheel 83 that drives shaft 86, to which are pivotably connected rudder 84 and linkage bar 85. The end of bar 85 opposite from shaft 86 is connected through swivel joints 87 to a linkage system comprising bars 88. The ends of bars 88 are rotatably coupled to rudders 89 and 90 whereby all three rudders are rotated in tandem, in the vertical plane, relative to the longitudinal axis of vehicle 11. Of course, shaft 86 and linkage bars 88 are journaled in fixedly mounted bearings 92, as required. The rudders are positioned so that the water current from the paddle wheel hits them. This feature and the fact that more than one rudder is used, gives the craft steerage even at very low forward speeds of the vehicle.

Removing the paddle wheel allows the vehicle to be towed underneath the water or on the surface without having the hydrodynamic drag of the paddle wheel to interfere.

To enable paddle wheel 51 to be readily removed from the vehicle hull, the releasable latching mechanism of FIGURE 7 is provided. On each side of the vehicle hull interior, a separate latching handle 94 is pivotably mounted to stud 93. Each of handles 94 carries a rubber pad that normally fits snugly against the respective bearing 67 for axle 53 and holds the same firmly in situ. Each of handles 94 is normally locked in position with spring loaded detent 96 that is carried on the hull interior. The hull is fabricated from transparent plastic in the vicinity of canopy 56 so locking handle 94 can be seen from the hull exterior and thereby easily be released from detent 96 and rotated to the position illustrated by the dotted lines. With handle 94 so rotated, bearings 67 are free to move and paddle wheel 51 can be removed.

Reference is now made to FIGURE 8 of the drawings wherein there is illustrated an alternative construction for canopy 56. In the illustrated construction, paddle wheel 51 can be mounted on the side of the vehicle. Canopy 56 has a generally arcuate shape with a rearwardly folding tuck 97 at its forward end. The arcuate shape continues around the aft end of paddle wheel 51 but in that area is provided with a multiplicity of holes to form baffle 65. From the top of baffle 65, rearwardly extending, tapering skirt 98 is provided to complete the water impervious canopy. Float 64, valve 63 and the air lines coupled to it are located behind baffle 65. It is realized that this pneumatic paddle wheel system of locomotion can be applied to other underwater and surface vehicles as well.

In the arrangement of FIGURE 8, two separate canopies and paddle wheels are provided, one on the starboard and one on the port side of the vessel so that the operator can be located in the center of the craft. Usually both paddle wheels in such an arrangement are driven from a common shaft although they may be driven from separate shafts to provide the same effects as a rudder.

While I have described and illustrated several specific embodiments of my invention, it will be clear that variations in the details of the embodiment specifically illustrated and described may be resorted to without departing from the true spirit and scope of the invention as defined in the appended claims.

I claim:

1. A submersible craft comprising relatively weak walls subjected to underwater pressures, said walls being susceptible to rupturing in response to a pre-determined pressure difference through their thicknesses, said pre-determined pressure difference being such as to be encountered by said craft at some depth in the range of depths within which said craft normally operates, and means for supplying high pressure gas to the interior of said walls to prevent the pressure difference between the interior and exterior of said walls from reaching said predetermined pressure difference and means for automatically varying the pressure of said gas as a direct function of the pressure difference across said walls to maintain said pressure difference substantially constant.

2. The craft of claim 1 further including means for exhausting gas from the interior volume defined by said walls at a location visible to the operator of the craft.

3. The craft of claim 1 wherein said walls comprise the water proof hull of said submersible.

4. The craft of claim 1 further including means for supplying breathable gas from said supplying means to scuba equipment worn by an operator located in said craft, said last named means comprising an intake manifold responsive to said supplying means for feeding gas to said scuba equipment, an exhaust manifold for receiving exhaled gas from said scuba equipment and means for feeding outlet gases from said exhaust manifold from the interior volume defined by said walls.

5. The craft of claim 1 further including a paddle wheel mounted in an air tight compartment exterior of said walls, said compartment extending inwardly of said craft from its bottom, and means responsive to gas from said supplying means for forcing water out of said compartment to form a gas bubble in which a portion of said wheel is located.

6. The craft of claim 5 further including means for exhausting gas from the interior volume defined by said walls, and means for feeding the gas exhausted from the interior volume to said compartment.

7. A submersible craft operable over an extended range of depths and having water tight walls, a paddle wheel mounted in an air tight compartment exterior of said walls, said compartment extending inwardly of said craft from its bottom, means for supplying high pressure gas, means for directing gas from said supplying means to said compartment for forcing water out of said compartment to form a gas bubble, said last-mentioned means including means for maintaining a gas bubble having substantially constant volume over the entire range of operation depths of submergence of said craft, a portion of said wheel being located in said gas bubble.

8. A submersible craft operable over an extended range of depths and having water tight walls, a paddle wheel mounted in an air-tight compartment exterior of said walls, said compartment extending inwardly of said craft from its bottom, means for supplying high pressure gas, means for directing gas from said supplying means to said compartment for forcing water out of said compartment to form a gas bubble, said last-mentioned means including means responsive to the level of the boundary layer of the bubble and the water to control the flow of gas to said compartment for maintaining said gas bubble at a substantially constant volume over the entire range of operating depths of said craft, an upper portion of said wheel being located in said gas bubble in said compartment.

9. The craft of claim 8 wherein said gas control means includes a float, said compartment including a baffle separating said float and said paddle wheel.

10. The craft of claim 9 wherein said baffle includes a multiplicity of apertures for enabling the float and paddle wheel average water levels to be the same while suppressing transient changes in water level resulting from turbulence from the paddle wheel from affecting the float level.

11. The craft of claim 7 including means for at will removing said paddle wheel from said craft.

12. The craft of claim 7 wherein said paddle wheel includes two segments, each of said segments being located on a different side of said craft in its mid fore-to-aft region.

13. The craft of claim 7 wherein said air tight compartment is bounded by a canopy having streamlined front and aft exterior surfaces.

14. The combination according to claim 4 further comprising a paddle wheel mounted in an air-tight compartment exterior of said walls, said compartment extending inwardly of said craft from its bottom, means responsive to gas from said supplying means for forcing water out of said compartment to form a gas bubble in which a portion of said wheel is located, means for exhausting gas from the interior volume defined by said walls, and means for feeding the gas exhausted from the interior volume, and said exhaust manifold to said compartment.

15. The combination according to claim 5 wherein said paddle wheel is buoyant in water.

16. The combination according to claim 2 wherein said means for exhausting gas comprises a passage through said wall into the surrounding medium, the egress orifice of said passage being visible interiorly of said craft.

References Cited

UNITED STATES PATENTS

| | | | |
|---|---|---|---|
| 1,561,086 | 11/1925 | Korjibski | 128—143 |
| 2,413,173 | 12/1946 | Cote | 115—54 X |
| 2,519,453 | 8/1950 | Goodman | 115—16 X |
| 2,823,636 | 2/1958 | Gongwer et al. | 114—16 |
| 3,255,723 | 6/1966 | Teetor | 114—16 |
| 3,299,645 | 1/1967 | Link | 114—16 X |

MILTON BUCHLER, *Primary Examiner.*

FERGUS S. MIDDLETON, *Examiner.*

T. M. BLIX, *Assistant Examiner.*